United States Patent
Jang et al.

(10) Patent No.: US 10,008,922 B2
(45) Date of Patent: Jun. 26, 2018

(54) SWITCHING POWER SUPPLY

(71) Applicant: SILICON WORKS CO., LTD., Daejeon-si (KR)

(72) Inventors: Won Suk Jang, Daejeon-si (KR); Young Jin Woo, Daejeon-si (KR); Tae Kyu Nam, Incheon-si (KR); Hong Kyu Choi, Cheongju-si (KR)

(73) Assignee: SILICON WORKS CO., LTD., Daejeon-si (KR)

( * ) Notice: Subject to any disclaimer, the term of this patent is extended or adjusted under 35 U.S.C. 154(b) by 0 days. days.

(21) Appl. No.: 15/648,812

(22) Filed: Jul. 13, 2017

(65) Prior Publication Data
US 2018/0019660 A1 Jan. 18, 2018

(30) Foreign Application Priority Data

Jul. 18, 2016 (KR) .................. 10-2016-0090588
Jun. 22, 2017 (KR) .................. 10-2017-0078971

(51) Int. Cl.
*H02M 3/156* (2006.01)
*H02M 1/32* (2007.01)
*H02M 1/08* (2006.01)
*H02M 1/00* (2006.01)

(52) U.S. Cl.
CPC .............. *H02M 1/32* (2013.01); *H02M 1/08* (2013.01); *H02M 3/156* (2013.01); *H02M 2001/0048* (2013.01)

(58) Field of Classification Search
CPC .... H02M 3/158; H02M 3/1582; H02M 3/155; H02M 3/157; H02M 3/156; H02M 1/32; H02M 1/08

USPC ................... 323/271, 273, 282–285, 351
See application file for complete search history.

(56) References Cited

U.S. PATENT DOCUMENTS

| | | | |
|---|---|---|---|
| 6,657,417 B1 * | 12/2003 | Hwang | G05F 1/70 323/207 |
| 8,018,212 B1 * | 9/2011 | Petricek | H02M 3/1582 323/259 |
| 9,048,734 B2 | 6/2015 | Qin | |
| 9,306,520 B2 | 4/2016 | Mathe et al. | |
| 9,653,986 B2 * | 5/2017 | Zhak | H02M 1/36 |

(Continued)

FOREIGN PATENT DOCUMENTS

| KR | 10-1238663 | 3/2013 |
|---|---|---|
| KR | 10-1477626 | 12/2014 |

*Primary Examiner* — Adolf Berhane
(74) *Attorney, Agent, or Firm* — Kile Park Reed & Houtteman PLLC

(57) ABSTRACT

A switching power supply may include: an inductor connected to an input voltage terminal; a first switch configured to form a first electrical path between the inductor and an output voltage terminal; a second switch configured to form a second electrical path between the inductor and a ground voltage terminal; a negative current sensor configured to sense an inductor current flowing through the first electrical path, and generate an over-current protection signal when the inductor current is sensed as a negative current equal to or more than a preset value; and a controller configured to enable a discontinuous conduction mode (DCM) when the over-current protection signal is generated, and turn off the first switch and turn on the second switch, in response to the enabled DCM.

13 Claims, 3 Drawing Sheets

(56) References Cited

U.S. PATENT DOCUMENTS

| | | | | |
|---|---|---|---|---|
| 2003/0222633 A1* | 12/2003 | Hwang | ................... | H02M 1/36 323/282 |
| 2007/0194721 A1* | 8/2007 | Vorperian | ............ | H05B 41/288 315/247 |
| 2009/0174485 A1* | 7/2009 | Teng | ....................... | H03F 1/523 330/298 |
| 2011/0043181 A1* | 2/2011 | Jing | ..................... | H02M 3/158 323/288 |
| 2012/0187932 A1* | 7/2012 | Singnurkar | ............ | H02M 3/07 323/282 |
| 2017/0237336 A1* | 8/2017 | Zhak | ...................... | H02M 1/36 323/311 |

* cited by examiner ized as having meanings matching technical concepts of the present invention. -->

SWITCHING POWER SUPPLY

BACKGROUND

1. Technical Field

The present disclosure relates to a switching power supply, and more particularly, to a switching power supply capable of improving power efficiency.

2. Related Art

In general, a switching power supply refers to a power supply that stabilizes an output by controlling an on/off time ratio of switching elements. Since the switching power supply can be reduced in size and weight while exhibiting high efficiency, the switching power supply is widely used in electronic devices and equipment.

The switching power supply includes an inductor, a high side switch, a low side switch and a zero current sensor.

When a current flowing through the inductor is sensed as zero through the zero current sensor during a boost operation, the switching power supply turns off the high side switch, and operates in a discontinuous conduction mode (DCM) for controlling a negative current flowing through the inductor.

In the conventional switching power supply, however, when the high side switch is turned off in the DCM, the negative current flows to a junction diode of the high side switch. Thus, the switching elements may be damaged, and the power efficiency may be degraded.

Furthermore, when both of the high side switch and the low side switch are turned off in the DCM, the EMI property of the switching power supply may be degraded by LC resonance caused by the inductor and a parasitic capacitor.

Recently, the maximized power efficiency is required even at a light load.

SUMMARY

Various embodiments are directed to a switching power supply capable of improving power efficiency, protecting elements, and improving the EMI property.

In an embodiment, a switching power supply may include: an inductor connected to an input voltage terminal; a first switch configured to form a first electrical path between the inductor and an output voltage terminal; a second switch configured to form a second electrical path between the inductor and a ground voltage terminal; a negative current sensor configured to sense an inductor current flowing through the first electrical path, and generate an over-current protection signal when the inductor current is sensed as a negative current equal to or more than a preset value; and a controller configured to enable a discontinuous conduction mode (DCM) when the over-current protection signal is generated, and turn off the first switch and turn on the second switch, in response to the enabled DCM.

The controller controls the second switch to maintain the on-state from a first time point that the DCM is enabled to a second time point that the inductor current is determined to be close to zero.

In another embodiment, a switching power supply may include: an inductor connected to an input voltage terminal; a first switch configured to form a first electrical path between the inductor and an output voltage terminal; a second switch configured to form a second electrical path between the inductor and a ground voltage terminal; a third switch configured to electrically connect both terminals of the inductor; a negative current sensor configured to sense an inductor current flowing through the first electrical path, and generate an over-current protection signal when the inductor current is sensed as a negative current equal to or more than a preset value; and a controller configured to enable a DCM when the over-current protection signal is generated, and turn off the first and second switches and turn on the third switch, in response to the enabled DCM.

The controller may control the third switch to maintain the on-state while the DCM is enabled.

In another embodiment, a switching power supply may include: an inductor connected to an input voltage terminal; a first switch configured to form a first electrical path between the inductor and an output voltage terminal; a second switch configured to form a second electrical path between the inductor and a ground voltage terminal; a third switch configured to electrically connect both terminals of the inductor; a negative current sensor configured to sense an inductor current flowing through the first electrical path, and generate an over-current protection signal when the inductor current is sensed as a negative current equal to or more than a preset value; and a controller configured to turn off the first switch when the over-current protection signal is generated, control the second switch to maintain an on-state until the inductor current reaches the zero current, and turn off the second switch and turn on the third switch when the inductor current reaches the zero current.

According to the embodiments of the present invention, a negative current equal to or more than the preset value is sensed, the switching power supply may turn off the high side switch (firs switch), and control the low side switch SW2 to maintain the on-state until the inductor current reaches the zero current. Thus, the switching power supply can prevent the negative current from flowing to junction diodes of the switches, thereby protecting the switch elements while improving the power efficiency.

Furthermore, the switching power supply may electrically connect both terminals of the inductor while the DCM is enabled. Thus, the switching power supply can prevent a negative current from flowing to junction diodes of the switches, thereby protecting the switch elements while improving the power efficiency. Furthermore, the switching power supply can prevent LC resonance by the inductor and a parasitic capacitor, thereby improving the EMI property.

DETAILED DESCRIPTION

Figure 1:
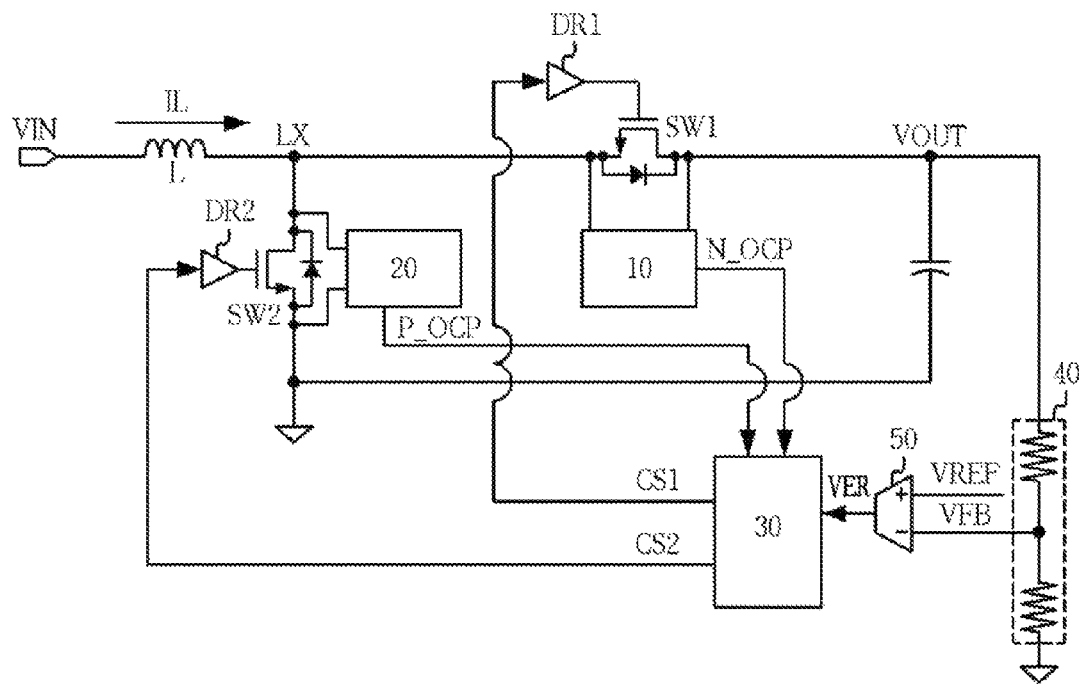
FIG. 1 is a circuit diagram of a switching power supply according to an embodiment of the present invention.

Hereafter, embodiments of the present invention will be described in detail with reference to the accompanying drawings. The terms used in the present specification and claims are not limited to typical dictionary definitions, but must be interpreted into meanings and concepts which coincide with the technical idea of the present invention.

Embodiments described in the present specification and configurations illustrated in the drawings are preferred embodiments of the present invention, and do not represent the entire technical idea of the present invention. Thus, various equivalents and modifications capable of replacing the embodiments and configurations may be provided at the point of time that the present application is filed.

FIG. 1 is a circuit diagram of a switching power supply according to an embodiment of the present invention.

Referring to FIG. 1, the switching power supply according to the embodiment of the present invention includes an inductor L, a high side switch SW1, a low side switch SW2, a negative current sensor 10, a positive current sensor 20, a controller 30, a resistor string 40 and an operational amplifier 50.

The inductor L is electrically connected to an input voltage terminal VIN.

The high side switch SW1 forms an electrical path between the inductor L and an output voltage terminal VOUT, and the low side switch SW2 forms an electrical path between the inductor L and a ground voltage terminal.

The high side switch SW1 and the low side switch SW2 may be implemented with N-channel field-effect transistors or P-channel field-effect transistors. However, the present embodiment is not limited thereto.

Between the output voltage terminal VOUT and the ground voltage terminal, an output capacitor is electrically connected. The output capacitor is charged by the electrical path formed between the inductor L and the output voltage terminal VOUT when the high side switch SW1 is turned on, and discharged through the output voltage terminal VOUT when the high side switch SW1 is turned off.

The switching power supply generates an output voltage VOUT by boosting an input voltage VIN through the current path formed by the turn-on/off of the low side switch SW2 and the high side switch SW1.

The current IL flowing through the inductor L is linearly increased or decreased by the current path formed by the turn-on/off of the low side switch SW2 and the high side switch SW1.

For example, when the low side switch SW2 is turned on and the high side switch SW1 is turned off, an electrical path is formed between the input voltage terminal VIN and the ground voltage terminal, and the inductor current IL is linearly increased. On the other hand, when the low side switch SW2 is turned off and the high side switch SW1 is turned on, an electrical path is formed between the input voltage terminal VIN and the output voltage terminal VOUT, and the inductor current IL is linearly decreased.

In this way, the low side switch SW2 and the high side switch SW1 are alternately turned on/off, and the input voltage VIN is boosted to the output voltage VOUT by the current path formed by the on/off of the low side switch SW2 and the high side switch SW1.

The negative current sensor 10 senses the voltages of both terminals of the high side switch SW1, and senses a negative current using a voltage difference between the terminals. The negative current sensor 10 generates a negative over-current protection signal N_OCP when the inductor current IL is sensed as a negative current equal to or more than a preset value.

The controller 30 enables the DCM when the negative over-current protection signal N_OCP is received from the negative current sensor 10. In response to the DCM, the controller 30 turns off the high side switch SW1, and turns on the low side switch SW2.

At this time, the controller 30 may be configured to control the low side switch SW2 to maintain the on-state from a point of time that the DCM is enabled to a point of time that the inductor current IL is determined to be close to zero. For example, the controller 30 may decide a turn-off time of the low side switch SW2 by counting a preset time from a point of time that the negative over-current protection signal N_OCP is generated, or turn off the low side switch SW2 at a point of time that the inductor current IL reaches zero.

The controller 30 provides a control signal CS1 to a driver DR1 to control the on/off of the high side switch SW1, and provides a control signal CS2 to a driver DR2 to control the on/off of the low side switch SW2.

The switching power supply having the above-described configuration may generate the negative over-current protection signal N_OCP when a negative current equal to or more than the preset value is sensed. When the negative over-current protection signal N_OCP is generated, the switching power supply may turn off the high side switch SW1, and maintain the on-state of the low side switch SW2 until the inductor current IL is determined to be close to zero. Thus, the switching power supply can prevent the negative current from flowing to the junction diodes of the switches, thereby protecting the switching elements while improving the power efficiency.

The positive current sensor 20 senses a positive current using a voltage difference between both terminals of the low side switch SW2. The positive current sensor 20 may generate a positive over-current protection signal P_OCP when a positive current equal to or more than a preset value is sensed.

When the positive over-current protection signal P_OCP is received, the controller 30 may generate the control signals CS1 and CS2 for controlling the high side switch SW1 and the low side switch SW2. For example, when the positive over-current protection signal P_COP is generated, the controller 30 may turn off the low side switch SW2, and turn on the high side switch SW1.

The resistor string 40 outputs a feedback voltage VFB which is obtained by dividing the output voltage VOUT, and the operational amplifier 50 amplifies a difference between a reference voltage VREF and the feedback voltage VFB, and outputs an error voltage VER.

The controller 30 controls the on/off of the high side switch SW1 and the low side switch SW2 according to the level of the error voltage VER. For example, when the error voltage VER is lower than a preset voltage, the controller 30 turns on the high side switch SW1, and turns off the low side switch SW2. On the other hand, when the error voltage VER is higher than the preset voltage, the controller 30 turns off the high side switch SW1, and turns on the low side switch SW2.

In a continuous conduction mode (CCM), the controller 30 controls the on/off of the high side switch SW1 and the low side switch SW2 according to the level of the error voltage VER. In the DCM, the controller 30 turns off the high side switch SW1 regardless of the error voltage VER, and maintains the on-state of the low side switch SW2 from a point of time that the DCM is enabled to a point of time that the inductor current IL is determined to be close to zero.

Figure 2:
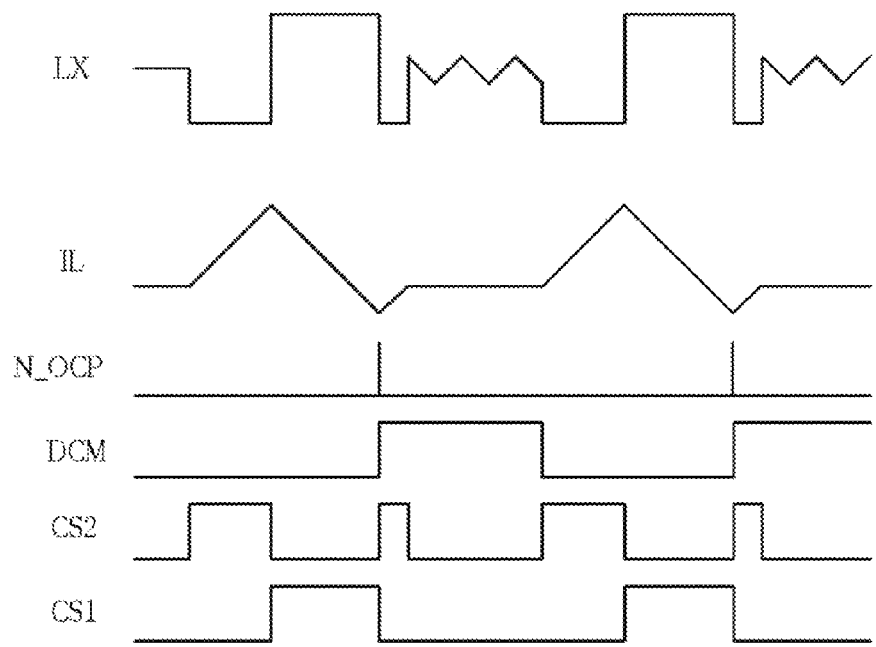
FIG. 2 is a timing diagram of the switching power supply according to the embodiment of the present invention.

FIG. 2 is a timing diagram of the switching power supply according to the embodiment of the present invention.

Referring to FIGS. 1 and 2, the switching power supply according to the embodiment of the present invention forms an electrical path between the input voltage terminal VIN and the ground voltage terminal, when the low side switch SW2 is turned on and the high side switch SW1 is turned off because the level of the error voltage VER is higher than the preset voltage. At this time, the inductor current IL is linearly increased.

When the low side switch SW2 is turned off and the high side switch SW1 is turned on because the level of the error voltage VER is lower than the preset voltage, an electrical path is formed between the input voltage terminal VIN and the output voltage terminal VOUT. At this time, the inductor current IL is linearly decreased, and the voltage of a node LX is boosted.

When a negative current equal to or more than the preset value is sensed, the switching power supply generates the negative over-current protection signal N_OCP, enables the DCM in response to the negative over-current protection signal N_OCP, turns off the high side switch SW1 in response to the DCM, and maintains the on-state of the low side switch SW2 from the point of time that the DCM is enabled to the point of time that the inductor current is determined to be close to zero.

As such, when the negative over-current protection signal N_OCP is generated, the switching power supply turns off the high side switch SW1 regardless of the error voltage VER, and maintains the on-state of the low side switch SW2 from the point of time that the DCM is enabled to the point of time that the inductor current is determined to be close to zero. Thus, the switching power supply can prevent the negative current from flowing to the junction diodes of the switches, thereby protecting the switching elements while improving the power efficiency.

When both of the high side switch SW1 and the low side switch SW2 are turned off while the DCM is enabled, the voltage of the node LX may cause LC resonance between the inductor L and a parasitic capacitor. Therefore, the present invention discloses a switching power supply according to another embodiment, which is capable of preventing the resonance of the voltage of the node LX while the DCM is enabled.

Figure 3:
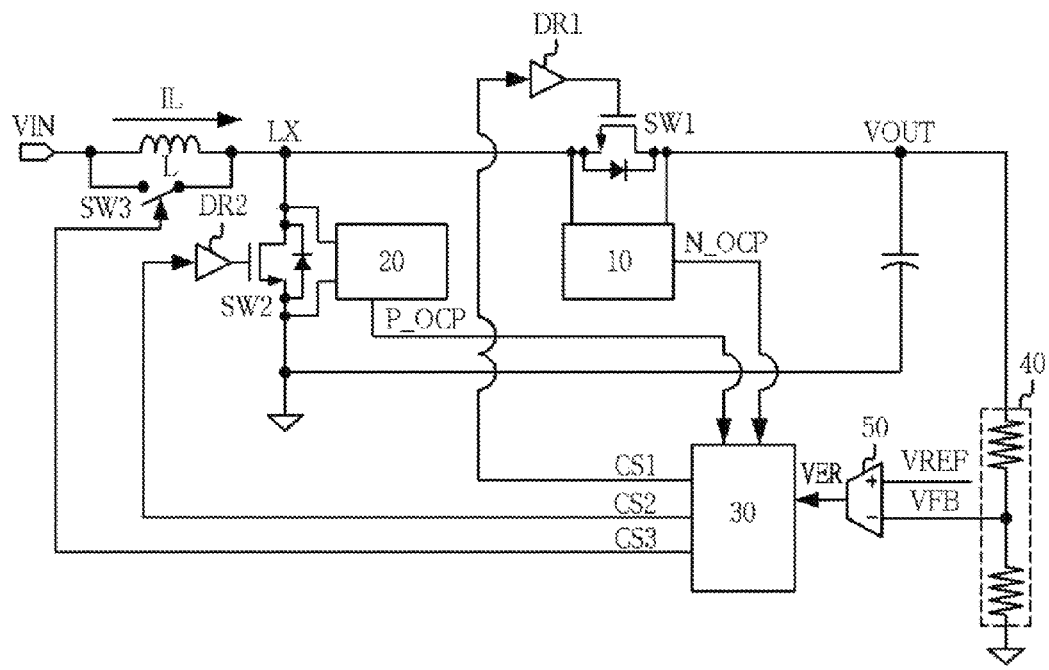
FIG. 3 is a circuit diagram of a switching power supply according to another embodiment of the present invention.

FIG. 3 is a circuit diagram of a switching power supply according to another embodiment of the present invention.

Referring to FIG. 3, the switching power supply according to the present embodiment includes an inductor L, a high side switch SW1, a low side switch SW2, a freewheeling switch SW3, a negative current sensor 10, a positive current sensor 20, a controller 30, a resistor string 40 and an operational amplifier 50.

The inductor L is electrically connected to an input voltage terminal VIN.

The high side switch SW1 electrically connects the inductor L and an output voltage terminal VOUT, and the low side switch SW2 electrically connects the inductor L and a ground voltage terminal.

Between the output voltage terminal VOUT and the ground voltage terminal, an output capacitor is electrically connected. The output capacitor is charged by the electrical path formed between the inductor L and the output voltage terminal VOUT when the high side switch SW1 is turned on, and discharged through the output voltage terminal VOUT when the high side switch SW1 is turned off.

The freewheeling switch SW3 electrically connects both terminals of the inductor L.

The negative current sensor 10 senses a negative current using a voltage difference between both terminals of the high side switch SW1, and generates a negative over-current protection current N_OCP when an inductor current IL is sensed as a negative current equal to or more than a preset value.

When the negative over-current protection signal N_OCP is generated, the controller 30 enables the DCM, turns off the high side switch SW1 and the low side switch SW2, and turns on the freewheeling switch SW3. At this time, the controller 30 controls the freewheeling switch SW3 to maintain the on-state from the point of time that the negative over-current protection signal N_OCP is generated to the point of time that the low side switch SW2 is turned on.

When the negative over-current protection signal N_OCP is generated, the controller 30 provides a control signal CS1 to a driver DR1 to turn off the high side switch SW1, provides a control signal CS2 to a driver DR2 to turn off the low side switch SW2, and provides a control signal CS3 to turn on the freewheeling switch SW3.

The freewheeling switch SW3 maintains the on-state while the DCM is enabled. However, since both of the high side switch SW1 and the low side switch SW2 are turned off while the DCM is enabled, the voltage of the node LX may cause LC resonance between the inductor L and a parasitic capacitor.

At this time, since the freewheeling switch SW3 electrically connects both terminals of the inductor L while the DCM is enabled, the freewheeling switch SW3 can prevent the negative current from flowing to the junction diodes of the switches, thereby protecting the switch elements while improving the power efficiency. Furthermore, the freewheeling switch SW3 can prevent the resonance of the voltage of the node LX by the inductor L and the parasitic capacitor.

Figure 4:
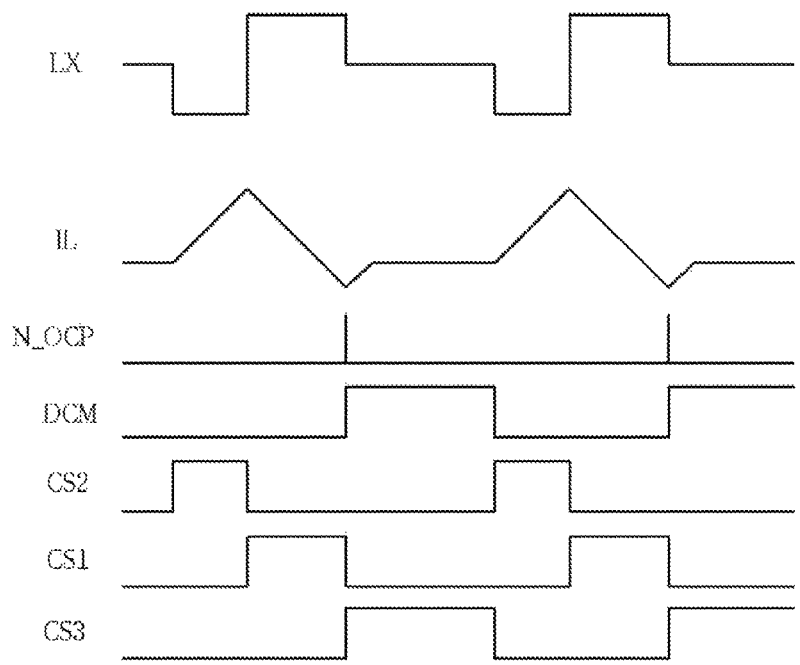
FIG. 4 is a timing diagram of the switching power supply according to the embodiment of the present invention.

FIG. 4 is a timing diagram of the switching power supply according to the embodiment of the present invention.

Referring to FIGS. 3 and 4, the switching power supply according to the present embodiment generates the negative over-current protection signal N_OCP when the inductor current IL is sensed as a negative current equal to or more than the preset value, and enables the DCM when the negative over-current protection signal N_OCP is generated.

Furthermore, the switching power supply turns off the high side switch SW1 and the low side switch SW2 in response to the DCM, and controls the freewheeling switch SW3 to maintain the on-state from the point of time that the DCM is enabled to the point of time that the low side switch SW2 is turned on.

As illustrated in FIG. 4, since both terminals of the inductor L are electrically connected while the DCM is enabled, the voltage of the node LX does not resonate.

Since the switching power supply according to the present embodiment electrically connects both terminals of the inductor L while the DCM is enabled, the switching power supply can prevent the negative current from flowing to the junction diodes of the switches, thereby protecting the switch elements while improving the power efficiency. Furthermore, the switching power supply can prevent the resonance of the voltage of the node LX by the inductor L and the parasitic capacitor, thereby improving the EMI property.

Figure 5:
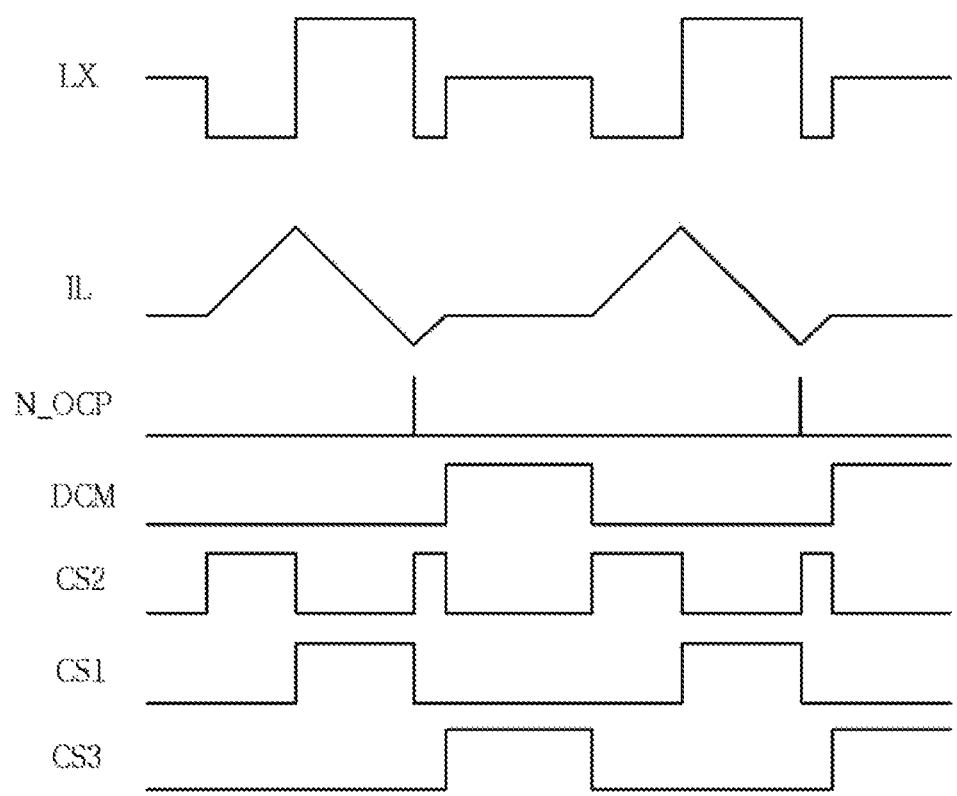
FIG. 5 is a timing diagram of a switching power supply according to still another embodiment of the present invention.

FIG. 5 is a timing diagram of a switching power supply according to still another embodiment of the present invention.

Referring to FIGS. 3 and 5, the switching power supply according to the embodiment of the present invention includes an inductor L, a high side switch SW1, a low side switch SW2, a freewheeling switch SW3, a negative current sensor 10, a positive current sensor 20, a controller 30, a resistor string 40 and an operational amplifier 50.

The negative current sensor 10 senses a negative current using a voltage difference between both terminals of the high side switch SW1, and generates an over-current protection current N_OCP when an inductor current IL is sensed as a negative current equal to or more than a preset value.

When the over-current protection signal N_OCP is generated, the controller 30 turns off the high side switch SW1, and turns on the low side switch SW2. When the inductor current IL reaches the zero current, the controller 30 enables the DCM, turns off the low side switch SW2, and turns on the freewheeling switch SW3.

At this time, the controller 30 counts a preset time from the point of time that the over-current protection signal N_OCP is generated, and determines the point of time that the inductor current IL reaches the zero current. When the inductor current IL reaches the zero current, the controller 30 turns off the low side switch SW2.

The controller 30 enables the DCM while the inductor current IL retains the zero current, and controls the freewheeling switch SW3 to maintain the on-state during the DCM.

When the over-current protection signal N_OCP is generated and the inductor current IL reaches the zero current through a turn-on of the low side switch SW2, the controller 30 electrically connects both terminals of the inductor L through the freewheeling switch SW3, thereby preventing the resonance of the voltage of the node LX by the inductor and the parasitic capacitor while the DCM is enabled.

Referring back to FIG. 5, the switching power supply according to the present embodiment generates the over-current protection signal N_OCP when the inductor current IL is sensed as a negative current equal to or more than the preset value.

Then, the switching power supply turns off the high side switch SW1 in response to the over-current protection signal N_OCP, and controls the low side switch SW2 to maintain the on-state until the inductor current IL reaches the zero current.

When the inductor current IL reaches the zero current, the switching power supply enables the DCM, turns off the low side switch SW2, and turns on the freewheeling switch SW3.

As such, when the over-current protection signal N_OCP is generated, the switching power supply controls the low side switch SW2 to maintain the on-state until the inductor current IL reaches the zero current. Thus, the switching power supply can prevent the negative current from flowing to the junction diodes of the switches, thereby protecting the switch elements while improving the power efficiency.

Furthermore, when the inductor current IL reaches the zero current, the switching power supply enables the DCM, and electrically connects both terminals of the inductor L through the freewheeling switch SW3. Thus, the switching power supply can prevent the resonance of the voltage of the node LX by the inductor and the parasitic capacitor while the DCM is enabled, thereby improving the EMI property.

While various embodiments have been described above, it will be understood to those skilled in the art that the embodiments described are by way of example only. Accordingly, the disclosure described herein should not be limited based on the described embodiments.

What is claimed is:

1. A switching power supply comprising:
   an inductor connected to an input voltage terminal;
   a first switch configured to form a first electrical path between the inductor and an output voltage terminal;
   a second switch configured to form a second electrical path between the inductor and a ground voltage terminal;
   a negative current sensor configured to sense an inductor current flowing through the first electrical path, and generate an over-current protection signal when the inductor current is sensed as a negative current equal to or more than a preset value; and
   a controller configured to enable a discontinuous conduction mode (DCM) when the over-current protection signal is generated, and turn off the first switch and turn on the second switch, in response to the enabled DCM.

2. The switching power supply of claim 1, wherein the controller controls the second switch to maintain the on-state from a first time point that the DCM is enabled to a second time point that the inductor current is determined to be close to zero.

3. The switching power supply of claim 1, wherein the controller determines the second time point that the inductor current reaches the zero current by counting a preset time from the first time point that the over-current protection signal is generated, and turns off the second switch at the second time point.

4. The switching power supply of claim 1, wherein the negative current sensor senses the negative current using a voltage difference between both terminals of the first switch.

5. The switching power supply of claim 1, further comprising:
   a resistor string configured to output a feedback voltage obtained by dividing the output voltage; and
   an operational amplifier configured to amplify a difference between a preset reference voltage and the feedback voltage, and output an error voltage,
   wherein the controller controls the on/off of the first and second switches according to the magnitude of the error voltage.

6. The switching power supply of claim 5, wherein the controller turns off the first switch regardless of the error voltage when the over-current protection signal is generated, and controls the second switch to maintain the on-state from the first time point that the DCM is enabled to the second time point that the inductor current is determined to be close to zero.

7. A switching power supply comprising:
   an inductor connected to an input voltage terminal;
   a first switch configured to form a first electrical path between the inductor and an output voltage terminal;
   a second switch configured to form a second electrical path between the inductor and a ground voltage terminal;
   a third switch configured to electrically connect both terminals of the inductor;
   a negative current sensor configured to sense an inductor current flowing through the first electrical path, and generate an over-current protection signal when the inductor current is sensed as a negative current equal to or more than a preset value; and
   a controller configured to enable a DCM when the over-current protection signal is generated, and turn off the first and second switches and turn on the third switch, in response to the enabled DCM.

8. The switching power supply of claim 7, wherein the controller controls the third switch to maintain the on-state from a first time point that the over-current protection signal is generated to a second time point that the second switch is turned on.

9. The switching power supply of claim 8, wherein the controller controls the third switch to maintain the on-state while the DCM is enabled.

10. A switching power supply comprising:
an inductor connected to an input voltage terminal;
a first switch configured to form a first electrical path between the inductor and an output voltage terminal;
a second switch configured to form a second electrical path between the inductor and a ground voltage terminal;
a third switch configured to electrically connect both terminals of the inductor;
a negative current sensor configured to sense an inductor current flowing through the first electrical path, and generate an over-current protection signal when the inductor current is sensed as a negative current equal to or more than a preset value; and
a controller configured to turn off the first switch when the over-current protection signal is generated, control the second switch to maintain an on-state until the inductor current reaches the zero current, and turn off the second switch and turn on the third switch when the inductor current reaches the zero current.

11. The switching power supply of claim 10, wherein the controller enables the DCM when the inductor current reaches the zero current through the turn-on of the second switch.

12. The switching power supply of claim 11, wherein the controller controls the third switch to maintain the on-state while the DCM is enabled.

13. The switching power supply of claim 10, wherein the controller determines the second time point that the inductor current reaches the zero current by counting a preset time from the first time point that the over-current protection signal is generated, and turns off the second switch at the second time point.

* * * * *